United States Patent [19]

Yokoyama et al.

[11] Patent Number: 5,578,694

[45] Date of Patent: Nov. 26, 1996

[54] PROCESS FOR PRODUCING AROMATIC POLYCARBONATE

[75] Inventors: Masuzo Yokoyama; Junji Takano; Masami Hasegawa; Yukiko Tatsukawa, all of Mie, Japan

[73] Assignee: Mitsubishi Chemical Corporation, Tokyo, Japan

[21] Appl. No.: 526,548

[22] Filed: Sep. 12, 1995

[30] Foreign Application Priority Data

Sep. 21, 1994 [JP] Japan ................................. 6-226992

[51] Int. Cl.$^6$ ............................. C08G 64/04; C07C 68/06
[52] U.S. Cl. ............................................. 528/198; 558/268
[58] Field of Search ............................... 558/268; 528/198

[56] References Cited

U.S. PATENT DOCUMENTS

| 3,442,854 | 5/1969 | Curtius et al. ..................... 528/198 |
| 4,345,062 | 8/1982 | Brunelle ............................. 528/198 |
| 5,340,905 | 8/1994 | Kuhling et al. ................... 528/198 X |
| 5,527,875 | 6/1996 | Yokoyama et al. .............. 528/198 X |

FOREIGN PATENT DOCUMENTS 4238123  5/1994  Germany.

*Primary Examiner*—Joseph McKane
*Assistant Examiner*—Michael G. Ambrose
*Attorney, Agent, or Firm*—Dilworth & Barrese

[57] ABSTRACT

A process for producing an aromatic polycarbonate is described, which comprises melt-polycondensing an aromatic diol compound with a diaryl carbonate compound in the presence of an interesterification catalyst, said interesterification catalyst comprising a quaternary phosphonium salt compound represented by formula (II):

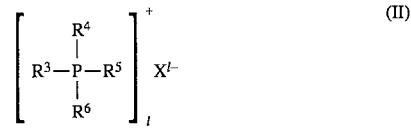

wherein $R^3$, $R^4$, $R^5$, and $R^6$ each independently represent an alkyl group having 1 to 12 carbon atoms, an aryl group, an aralkyl group, or a cycloalkyl group, and $X^{l-}$ is an anion selected from the group consisting of a carbonate ion, a phosphate ion, and a tetrahydroxyboron ion, with the letter l indicating the valency of X.

12 Claims, No Drawings

PROCESS FOR PRODUCING AROMATIC POLYCARBONATE

FIELD OF THE INVENTION

The present invention relates to a process for producing an aromatic polycarbonate by interesterification. More particularly, it relates to a process for producing an aromatic polycarbonate having improved heat resistance and improved hue by the melt polycondensation of an aromatic diol compound with a diaryl carbonate compound.

BACKGROUND OF THE INVENTION

Aromatic polycarbonates are excellent not only in mechanical characteristics including impact resistance but also in heat resistance, transparency, and other properties, and have been widely used as engineering plastics in a broad range of fields such as, e.g., bottles for carbonated beverages, electronic bases (CD bases), and transfer belts.

Industrially established processes for producing aromatic polycarbonates include the so-called phosgene process, in which an aromatic diol, e.g., a bisphenol, is reacted with phosgene by interfacial polycondensation.

However, the phosgene process has many disadvantages, e.g., the necessity of use of phosgene, which is toxic to the human body, the inclusion of sodium chloride yielded in a large quantity as a by-product into the polymer produced, the necessity of troublesome wastewater treatment, and the fear of health and air-pollution problems caused by the methylene chloride usually used as a reaction solvent. That is, the phosgene process incurs high equipment costs for taking countermeasures against these health and environmental problems.

The so-called melt polycondensation process or non-phosgene process has also been long known, in which an aromatic polycarbonate is obtained by the interesterification of a diaryl carbonate compound with an aromatic diol compound. This non-phosgene process is generally regarded not only as free of the above-mentioned various problems associated with the phosgene process, but also as advantageous in that an aromatic polycarbonate can be produced at a lower cost. However, the aromatic polycarbonate obtained by the non-phosgene process in which bisphenol A is reacted with diphenyl carbonate generally has a higher content of terminal hydroxyl groups than that obtained by the phosgene process using, for example, bisphenol A, phosgene, a terminal blocker, etc. In addition, a residue of the catalyst used in the non-phosgene process adversely influences the polymer. As a result, the aromatic polycarbonate obtained by the non-phosgene process is generally inferior in heat resistance and hue to that obtained by the phosgene process.

For example, aromatic polycarbonates produced from bisphenol A and phosgene by the phosgene process have a heat resistance of about 500° C. in terms of temperature causing a 5% weight loss on heating (Td5%), which will be described later, whereas aromatic polycarbonates produced by the non-phosgene process generally have a lower heat resistance, sometimes by at least several tens of degrees C., although the heat resistance of the latter polycarbonates varies depending on the kind and amount of the interesterification catalyst used and on the content of terminal hydroxyl groups in the aromatic polycarbonates obtained.

Because molding of aromatic polycarbonates should be conducted at a high temperature around 320° C., polycarbonates having insufficient heat resistance give rise to problems such as cleavage of the polymer backbone, coloration, and a decrease in mechanical strength. In particular, an especially high molding temperature is needed for obtaining a reduced melt viscosity in the case of molding for producing thin-walled (0.3–0.6 mm) hollow containers or injection or extrusion molding for producing articles with complicated shapes. Therefore, in order that an aromatic polycarbonate obtained by the non-phosgene process be put to practical use, improvement in heat resistance and prevention of coloration are much desired.

The interesterification process has another drawback that since the interesterification reaction is performed at high temperatures, undesirable side reactions may take place during the progress of the main reaction depending on the kind of the catalyst used. It is known that as a result of such side reactions, different kinds of units, e.g., phenyl salicylate units, are formed in the polymer backbone. Since the phenyl salicylate structure is a precursor for the dihydroxybenzophenone framework regarded as a cause of hue deterioration, the generation of phenol salicylate structures should be minimized in order to improve hue. If reaction proceeds from these different kinds of units, a branched aromatic polycarbonate results, which is inferior, in optical and mechanical characteristics, to linear aromatic polycarbonates.

Known interesterification catalysts for use in producing aromatic polycarbonates having improved hue in the non-phosgene process include quaternary ammonium or phosphonium salts, e.g., tetraphenylphosphonium tetraphenylboranate, triphenylbutylphosphonium tetraphenylboranate, and tetraphenylphosphonium fluoride (see JP-B-47-17978, JP-A-6-200009, Belgian Patent 675,190, and German Patent 431,239), and boron hydride compounds represented by the formula $R'_4P.BH_nR_{4-n}$ (R and R' each is a hydrocarbon group and n is 0 or an integer of 1 to 4) (see U.S. Pat. Nos. 4,330,664 and 5,221,761). (The terms "JP-B" and "JP-A" as used herein mean an "examined Japanese patent publication" and an "unexamined published Japanese patent application", respectively.)

However, while the aromatic polycarbonates obtained with these prior art catalysts have improved hue they have insufficient molecular weight and poor heat resistance or they have a heat resistance (Td5%) as low as 475° to 480° C. while having improved hue and a high molecular weight.

JP-A-6-200009 discloses a technique of using a quaternary ammonium compound or a quaternary phosphonium compound as an interesterification catalyst under specific melt polycondensation conditions to produce an aromatic polycarbonate having a reduced content of different kinds of units including branches.

However, there is a description in the above reference to the effect that use of an interesterification catalyst comprising a combination of any of these onium salts with an alkali metal compound disadvantageously results in a significantly increased content of branches, as demonstrated in Reference Examples 6 and 7 given therein.

The combined use of the quaternary phosphonium compound disclosed in JP-A-6-200009 and an alkali metal compound as an interesterification catalyst is evaluated in Comparative Examples described hereinafter, wherein it is demonstrated that aromatic polycarbonates containing different kinds of units in considerably large amounts (see Comparative Examples 5 and 6) are obtained.

In U.S. Pat. No. 4,363,905, there is a description in Column 6, Table III, Run No. IV-II to the effect that an aromatic polycarbonate having a weight-average molecular weight of 400 and a satisfactory hue was produced by melt-polycondensing bisphenol A with diphenyl carbonate using a combination of $Bu_4PBr$ and sodium phenolate as an interesterification catalyst. However, such a low-molecular aromatic polycarbonate encounters difficulty in injection molding or extrusion molding. There also is a description in Table II-I, Run No. III to the effect that an aromatic polycarbonate having a weight-average molecular weight of 8,400 and an excellent hue was obtained by melt-polycondensing bisphenol A with bis(o-nitrophenyl) carbonate using the same catalyst system. In Run No. III, because of the use of bis(o-nitrophenyl) carbonate as a starting diaryl carbonate, the material cost is high and heat stability during melt polycondensation is poor, resulting in inclusion of decomposition products into the produced aromatic polycarbonate. Thus, the aromatic polycarbonate obtained has an unsatisfactory hue and reduced mechanical strength, e.g., low impact strength.

SUMMARY OF THE INVENTION

An object of the present invention is to provide an interesterification polycondensation process (non-phosgene process) for producing an aromatic polycarbonate having an improved hue and a high thermal decomposition temperature and showing substantially no change in molecular weight on thermal melting, which process does not involve formation of a polymer gel.

The present invention provides a process for producing an aromatic polycarbonate which comprises melt-polycondensing an aromatic diol compound with a diaryl carbonate compound represented by formula (I):

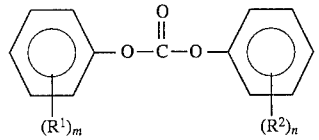

wherein $R^1$ and $R^2$ each independently represent an alkyl group having 1 to 10 carbon atoms or an alkoxy group, and m and n each is 0 or an integer of 1 or 2, in the presence of an interesterification catalyst, said interesterification catalyst comprising a quaternary phosphonium salt compound represented by formula (II):

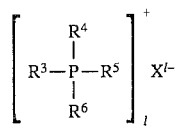

wherein $R^3$, $R^4$, $R^5$, and $R^6$ each independently represent an alkyl group having 1 to 12 carbon atoms, an aryl group, an aralkyl group, or a cycloalkyl group, and $X^{l-}$ is an anion selected from the group consisting of a carbonate ion, a phosphate ion, and a tetrahydroxyboron ion, with the letter l indicating the valency of X.

According to the present invention, the interesterification catalyst exhibits sufficient activity even when used in a small amount due to the use of the specific quaternary phosphonium salt compound, and the aromatic polycarbonate obtained has excellent hue and excellent heat resistance.

DETAILED DESCRIPTION OF THE INVENTION

Aromatic Diol Compound

The aromatic diol compound used in the process of this invention is represented by formula (III):

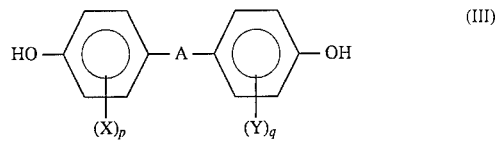

wherein A represents a single bond or a divalent group selected from the group consisting of a substituted or unsubstituted, linear, branched, or cyclic divalent hydrocarbon group having 1 to 15 carbon atoms, —O—, —S—, —CO—, —SO—, and —$SO_2$—; X and Y, which may be the same or different, each represent a hydrogen atom, a halogen atom, or a hydrocarbon group having 1 to 6 carbon atoms; and p and q each is 0 or an integer of 1 or 2.

Typical examples of the aromatic diol compound include bisphenols, e.g., bis(4-hydroxydiphenyl)methane, 2,2-bis(4-hydroxyphenyl)propane, 2,2-bis(4-hydroxy-3-methylphenyl)propane, 2,2-bis(4-hydroxy-3-t-butylphenyl)propane, 2,2-bis(4-hydroxy-3,5-dimethylphenyl)propane, 2,2-bis(4-hydroxy-3,5-dibromo)propane, 4,4-bis(4-hydroxyphenyl)heptane, and 1,1-bis(4-hydroxyphenyl)cyclohexane; biphenyls, e.g., 4,4'-dihydroxybiphenyl and 3,3',5,5'-tetramethyl-4,4'-biphenyl; and other aromatic diol compounds such as bis(4-hydroxyphenyl) sulfone, bis(4-hydroxyphenyl) sulfide, bis(4-hydroxyphenyl) ether, and bis(4-hydroxyphenyl) ketone.

Preferred of these is 2,2-bis(4-hydroxyphenyl)propane, called bisphenol A.

These aromatic diol compounds may be used either individually or as a combination of two or more thereof (to yield a copolycarbonate). In producing a branched aromatic polycarbonate, a tri- or higher hydric phenol may be copolymerized in a small proportion. For the purpose of further improving the thermal stability or hydrolytic resistance of the resulting aromatic polycarbonate, a monohydric phenol, such as p-t-butylphenol or p-cumylphenol may be used to block terminal hydroxyl groups.

Diaryl Carbonate Compound

Examples of the diaryl carbonate compound represented by formula (I) include diphenyl carbonate, ditolyl carbonate, dixylyl carbonate, bisbutylphenyl carbonate, bisnonylphenyl carbonate, bismethoxyphenyl carbonate, and bisbutoxyphenyl carbonate. Of these, diphenyl carbonate is preferred.

The diaryl carbonate compound is generally used in excess, preferably in an amount of from 1.01 to 1.30 mol, more preferably from 1.02 to 1.20 mol, per mol of the aromatic diol compound.

Interesterification Catalyst

It is essential that the interesterification catalyst for use in the present invention comprises a quaternary phosphonium salt compound represented by formula (II). Furthermore, in accordance with the present invention, the interesterification catalyst preferably comprises a combination of the quaternary phosphonium salt compound and an alkali metal compound.

(Quaternary Phosphonium Salt Compound)

While it is known that many quaternary phosphonium salt compounds are useful as an interesterification catalyst, halogen salts (represented by formula (II) where X is Cl, Br, or F) are undesirable. The quaternary phosphonium salt compounds that can be used in the present invention are the compounds represented by formula (II), wherein $X^{l-}$ is an anion selected from a carbonate ion, a phosphate ion, and a tetrahydroxyboron ion. In formula (II), $R^3$, $R^4$, $R^5$, and $R^6$ may be substituted with a polar group. Preferred are quaternary phosphonium salt compounds represented by formula (II) wherein $X^{l-}$ is an anion selected from a carbonate ion and a tetrahydroxyboron ion. More preferably $X^{l-}$ is a tetrahydroxyboron ion.

Examples of such quaternary phosphonium salt compounds include tetraethylphosphonium carbonate, tetraethylphosphonium phosphate, tetraethylphosphonium tetrahydroxyborate, tetrabutylphosphonium carbonate, tetrabutylphosphonium phosphate, tetrabutylphosphonium tetrahydroxyborate, tetraphenylphosphonium carbonate, tetraphenylphosphonium phosphate, tetraphenylphosphonium tetrahydroxyborate, methyltriphenylphosphonium carbonate, methyltriphenylphosphonium phosphate, methyltriphenylphosphonium tetrahydroxyborate, allyltriphenylphosphonium carbonate, allyltriphenylphosphonium phosphate, allyltriphenylphosphonium tetrahydroxyborate, butyltriphenylphosphonium carbonate, butyltriphenylphosphonium phosphate, butyltriphenylphosphonium tetrahydroxyborate, hexyltriphenylphosphonium carbonate, hexyltriphenylphosphonium phosphate, hexyltriphenylphosphonium tetrahydroxyborate, 4-carboxybutyltriphenylphosphonium carbonate, 4-carboxybutyltriphenylphosphonium phosphate, 4-carboxybutyltriphenylphosphonium tetrahydroxyborate, 2-dimethylaminoethyltriphenylphosphonium carbonate, 2-dimethylaminoethyltriphenylphosphonium phosphate, 2-dimethylaminoethyltriphenylphosphonium tetrahydroxyborate, tetrakis(hydroxymethyl)phosphonium carbonate, tetrakis(hydroxymethyl)phosphonium phosphate, and tetrakis(hydroxymethyl)phosphonium tetrahydroxyborate.

Of the compounds enumerated above, tetraethylphosphonium carbonate, tetraethylphosphonium tetrahydroxyborate, tetrabutylphosphonium carbonate, and tetrabutylphosphonium tetrahydroxyborate are preferred in that an aromatic polycarbonate having a higher molecular weight is obtained with these phosphonium compounds.

(Alkali Metal Compound)

Examples of the alkali metal compound include inorganic alkali metal compounds such as hydroxides, carbonates, and hydrogencarbonates of lithium, sodium, potassium, rubidium, and cesium; and organic alkali metal compounds such as alcoholates, phenolates, and organic carboxylates of these alkali metals. Of these alkali metal compounds, cesium compounds are preferred. Specific examples of the most desirable cesium compounds include cesium carbonate, cesium hydrogencarbonate, and cesium hydroxide.

The components of the interesterification catalyst for use in the present invention are preferably employed in the form of an aqueous or alcoholic solution thereof or in a solid form.

The quaternary phosphonium salt compound as the essential component of the interesterification catalyst is used in an amount of from $10^{-8}$ to $10^{-2}$ mol, preferably from $10^{-6}$ to $10^{-3}$ mol, per mol of the aromatic diol compound. On the other hand, the alkali metal compound as an optional component of the catalyst is preferably used in an amount of from $10^{-10}$ to $10^{-5}$ mol, more preferably from $10^{-8}$ to $10^{-6}$ mol, per mol of the aromatic diol compound.

When the alkali metal compound is introduced into a reaction system in the form of an aqueous solution thereof, water is used in an amount of from $10^{-6}$ to 1 mol, preferably from $1 \times 10^{-4}$ to $0.3 \times 10^{1}$ mol, per mol of the aromatic diol compound.

The molar proportion of the alkali metal compound to the quaternary phosphonium salt compound is preferably from $10^{-6}:1$ to $1:1$, especially preferably from $10^{-5}:1$ to $1:1$.

If the amount of the interesterification catalyst used is too large or if the two catalyst components are used in an inadequate proportion, the reaction tends to form a polymer gel or to form a polymer backbone containing structures other than the desired carbonate units, such as a salicylic ester structure, a dihydroxybenzophenone structure, and a xanthone structure, resulting in adverse affects on the physical properties of the resulting aromatic polycarbonate. The aromatic polycarbonate thus obtained has reduced heat resistance and a deteriorated hue, and results in further impaired properties through melt molding and under use conditions due to those defects in the molecular structure and the influences of a catalyst residue.

If the amount of the catalyst used is too small, an aromatic polycarbonate having a sufficiently high molecular weight for mechanical strength is difficult to obtain.

Melt Polycondensation

The interesterification melt polycondensation in the present invention can be carried out in accordance with known melt polycondensation techniques for producing aromatic polycarbonates, except that the specific quaternary phosphonium salt compound is incorporated as an interesterification catalyst into the reaction system.

In greater detail, the starting materials are subjected to melt polycondensation by interesterification at a temperature of, for example, from 100° to 350° C. and at ordinary or a reduced pressure, while removing by-products. The reaction is generally carried out in two or more stages. In the first-stage reaction, the starting materials and the catalyst are heated at 100° to 200° C. in an inert gas atmosphere at ordinary or an elevated pressure, during which stage an interesterification reaction and a reaction for forming a low-molecular oligomer (having a number-average molecular weight of from 400 to 1,000) occur. In the second-stage reaction, the temperature of the reaction system is further increased (to 200° to 250° C.) and the pressure is reduced (to 20 Torr or lower) to remove the phenol by-product from the reaction system, whereby the interesterification reaction and the reaction for forming a low-molecular oligomer and for the chain growth thereof (to a number-average molecular weight of from 1,000 to 7,000) are allowed to proceed. Thereafter, mainly the phenol and the diaryl carbonate compound are removed from the reaction system at a higher temperature (250° to 330° C.) under high vacuum (1 Torr or lower) to allow the oligomer chains to grow. Thus, an aromatic polycarbonate having a high molecular weight is obtained.

The reaction time in each stage may be suitably determined according to the progress of the reaction. From the standpoint of the hue of the resulting polymer, the reaction times are as follows. At temperatures around 200° C., the hue is not appreciably affected by a slight prolongation in reaction time, and the reaction time is generally from 0.5 to 5 hours. At temperatures of from 200° to 250° C., the reaction time is generally from 0.1 to 3 hours. At temperatures exceeding 250° C., a prolonged reaction time exerts a significant adverse influence on the hue. Consequently, the reaction time for the final stage is desirably 1 hour or shorter, preferably from 0.1 to 1 hour.

The melt polycondensation may be carried out either batch-wise or continuously using various apparatus. Usually, reactors of different types are used for the individual reaction stages. Although the reactors are not particularly limited in structure thereof, reactors having a stirrer for high-viscosity liquid are preferably used for the latter reaction stages, where the viscosity of the reaction system increases greatly.

The aromatic polycarbonate obtained by the process of the present invention has a high molecular weight, namely a number-average molecular weight ($M_n$) of about from 2,500 to 25,000 and a weight-average molecular weight ($M_w$) of about from 7,000 to 60,000, preferably about from 13,000 to 30,000. The aromatic polycarbonate preferably has a Q value ($M_w/M_n$), serving as an index to molecular weight distribution, of from 2 to 3.

When about 10 mg of the aromatic polycarbonate is precisely weighed out and heated in a nitrogen stream at a rate of 20° C./min using thermogravimetric analyzer 200-TG/DTA 220, manufactured by Seiko Denshi Kogyo Co., Ltd., Japan, the temperature at which the weight loss of the aromatic polycarbonate has reached 5% of the initial weight is not lower than 480° C., preferably from 490° to 520° C. The above-identified temperature is taken as a heat resistance temperature and referred to as Td5%.

The hydroxyl group content of the aromatic polycarbonate is preferably not higher than about 0.1% by weight. The absorbance of UV (ultraviolet) light having a wavelength of 318 nm is preferably not higher than 0.15.

Various additives may be incorporated into the aromatic polycarbonate obtained by practicing the present invention. Examples of useful additives include catalyst stabilizers, heat stabilizers, ultraviolet absorbers, antistatic agents, colorants, fluidity modifiers, parting agents, and reinforcing fillers.

If desired, the aromatic polycarbonate of the present invention may be blended with other resins such as, e.g., an ethylene-vinyl acetate copolymer, a polyamide, polystyrene, ABS, AES, polypropylene, EPR, and EPDM.

The present invention will be explained below in more detail by reference to Examples. The aromatic polycarbonates obtained by the present invention were analyzed by the following methods.

(i) Molecular Weight

Molecular weight was measured by gel-permeation chromatography (GPC, with HLC-8020, manufactured by Tosoh Corp., Japan) using chloroform solvent at 35° C., and calculated for known molecular weight of polycarbonate.

(ii) Heat Resistance, Td5% (5% weight loss temperature)

Using a thermogravimetric analyzer (200-TG/DTA 220) manufactured by Seiko Denshi Kogyo Co., Ltd., an aromatic polycarbonate sample was heated in a nitrogen stream at a rate of 20° C./min to determine the temperature at which the weight loss of the sample had reached 5% of the initial weight.

(iii) Hue

An aromatic polycarbonate sample was thermally melted at 320° C. for 30 minutes and dissolved in methylene chloride to prepare a 4% solution, and the absorbance of UV (ultraviolet) light having a wavelength of 345 nm was measured at a light pass length of 1 cm. The greater the absorbance, the higher the degree of coloration. Aromatic polycarbonates obtained by the ordinary phosgene process have an absorbance of 0.05 or lower.

(iv) Content of Different Kind of Units

An aromatic polycarbonate sample was thermally melted at 320° C. for 30 minutes and dissolved in methylene chloride to prepare a 4% solution, and the absorbance of UV (ultraviolet) light having a wavelength of 318 nm (maximum absorption wavelength assigned to phenyl salicylate structure) was measured at a light pass length of 1 cm. The greater the absorbance, the higher the content of the different kind of units. Aromatic polycarbonates obtained by the ordinary phosgene process have an absorbance of 0.15 or lower.

EXAMPLE 1

Into a 300-ml reactor made of SUS-316 and equipped with a stirrer and a distillation column were introduced 0.1 mol (22.8 g) of BPA (bisphenol A) and 0.107 mol (23.1 g) of DPC (diphenyl carbonate). After the atmosphere within the reactor was replaced with nitrogen gas, $6.2 \times 10^{-8}$ mol (0.020 mg) of $Cs_2CO_3$ (cesium carbonate) (2 μl of 1% aqueous solution thereof) and $1.25 \times 10^{-5}$ mol (7.24 mg) of $(Bu_4P)_2CO_3$ (tetrabutylphosphonium carbonate; synthesized from tetrabutylphosphonium hydroxide and dry ice (solid $CO_2$) through acid-base reaction) (52 μl of 0.24 mol/l aqueous solution thereof) were added thereto as catalyst components in a nitrogen atmosphere.

The reactor was heated to 150° C. to keep the mixture in a molten state at ordinary pressure for 1 hour. After the temperature was increased to 200° C., the pressure was gradually reduced to 20 Torr and this state was maintained for 1 hour to distill off the phenol.

The temperature of the reaction system was then further elevated to 250° C., and the pressure inside the reactor was lowered to 0.5 Torr at that temperature. Polycondensation was conducted under these conditions for 1 hour to obtain about 25 g of a polymer (aromatic polycarbonate).

The analytical results for the aromatic polycarbonate obtained are shown in Table 1.

EXAMPLES 2 TO 4

Aromatic polycarbonates were obtained in the same manner as in Example 1 except that the amount of $(Bu_4P)_2CO_3$ used as an interesterification catalyst component was changed as shown in Table 1.

The analytical results for the aromatic polycarbonates obtained are shown in Table 1.

EXAMPLES 5 AND 6

Aromatic polycarbonates were obtained in the same manner as in Example 1, except that $(Bu_4P)_3PO_4$ (tetrabutylphosphonium phosphate; synthesized from tetrabutylphosphonium hydroxide and phosphoric acid through acid-base reaction) was used in the amounts shown in Table 1 in place of $(Bu_4P)_2CO_3$ as an interesterification catalyst component.

The analytical results for the aromatic polycarbonates obtained are shown in Table 1.

COMPARATIVE EXAMPLE 1

An aromatic polycarbonate was obtained in the same manner as in Example 1, except that $6.2 \times 10^{-8}$ mol (0.020 mg) of $Cs_2CO_3$ (2 μl of 1% aqueous solution thereof) was used alone as an interesterification catalyst.

The analytical results for the aromatic polycarbonate obtained are shown in Table 1.

COMPARATIVE EXAMPLE 2

Into a 300-ml reactor made of SUS-316 and equipped with a stirrer and a distillation column were introduced 0.1 mol (22.8 g) of BPA (bisphenol A) and 0.107 mol (23.1 g) of DPC (diphenyl carbonate). After the atmosphere within the reactor was replaced with nitrogen gas, $1.2 \times 10^{-7}$ mol (0.039 mg) of $Cs_2CO_3$ (cesium carbonate) (2 µl of 2% aqueous solution thereof) and $8.2 \times 10^{-6}$ mol (2.37 mg) of $Bu_4PBr$ (tetrabutylphosphonium bromide) (15.8 µl of 15% aqueous solution thereof) were added thereto as catalyst components in a nitrogen atmosphere.

The reactor was heated to 150° C. to keep the mixture in a molten state at ordinary pressure for 1 hour. After the temperature was increased to 200° C., the pressure was gradually reduced to 20 Torr and this state was maintained for 1 hour to distill off the phenol.

The temperature of the reaction system was then further elevated to 250° C., and the pressure inside the reactor was lowered to 0.5 Torr at that temperature. Polycondensation was conducted under these conditions for 1 hour to obtain about 25 g of a polymer (aromatic polycarbonate).

The analytical results for the aromatic polycarbonate obtained are shown in Table 1.

COMPARATIVE EXAMPLE 3

An aromatic polycarbonate was obtained in the same manner as in Comparative Example 2, except that $8.2 \times 10^{-6}$ mol (1.68 mg) of $Bu_3P$ (tributyl phosphine) was used in place of $Bu_4PBr$ as an interesterification catalyst component.

The analytical results for the aromatic polycarbonate obtained are shown in Table 1.

EXAMPLES 7 AND 8

Aromatic polycarbonates were obtained in the same manner as in Example 1, except that $Bu_4PB(OH)_4$ (tetrabutylphosphonium tetrahydroxyborate; synthesized from tetrabutylphosphonium hydroxide and boric acid through acid-base reaction) was used in the amounts shown in Table 1 in place of $(Bu_4P)_2CO_3$ as an interesterification catalyst component.

The analytical results for the aromatic polycarbonates obtained are shown in Table 1.

EXAMPLES 9 TO 13

Aromatic polycarbonates were obtained in the same manner as in Example 1, except that the various quaternary phosphonium salt compounds shown in Table 2 were used as an interesterification catalyst component in the amounts shown in the table.

The analytical results for the aromatic polycarbonates obtained are shown in Table 2.

COMPARATIVE EXAMPLE 4

An aromatic polycarbonate was obtained in the same manner as in Example 1, except that $6.2 \times 10^{-8}$ mol of $Cs_2CO_3$ and $2.5 \times 10^{-5}$ mol of $Et_4POH$ (tetraethylphosphonium hydroxide) were used as an interesterification catalyst.

The analytical results for the aromatic polycarbonate obtained are shown in Table 2.

TABLE 1

| | Interesterification catalyst | | | | Analytical results for aromatic polycarbonate | | | |
|---|---|---|---|---|---|---|---|---|
| | Alkali metal compound | Amount (mol/ mol-BPA) | Quaternary phosphonium compound | Amount (mol/ mol-BPA) | Weight-average molecular weight (Mw) | Heat resistance (Td 5%, °C.) | Hue (UV, $A_{345}$) | Content of different kind of units (UV, $A_{318}$) |
| Example 1 | $Cs_2CO_3$ | $6.2 \times 10^{-7}$ | $(Bu_4P)_2CO_3$ | $1.25 \times 10^{-4}$ | 12,400 | 498 | 0.044 | 0.090 |
| Example 2 | $Cs_2CO_3$ | $6.2 \times 10^{-7}$ | $(Bu_4P)_2CO_3$ | $5.0 \times 10^{-5}$ | 12,200 | 495 | 0.020 | 0.076 |
| Example 3 | $Cs_2CO_3$ | $6.2 \times 10^{-7}$ | $(Bu_4P)_2CO_3$ | $2.5 \times 10^{-4}$ | 10,300 | 492 | 0.019 | 0.041 |
| Example 4 | $Cs_2CO_3$ | $6.2 \times 10^{-7}$ | $(Bu_4P)_2CO_3$ | $5.0 \times 10^{-6}$ | 12,200 | 492 | 0.014 | 0.032 |
| Example 5 | $Cs_2CO_3$ | $6.2 \times 10^{-7}$ | $(Bu_4P)_3PO_4$ | $2.5 \times 10^{-4}$ | 10,200 | 494 | 0.023 | 0.043 |
| Example 6 | $Cs_2CO_3$ | $6.2 \times 10^{-7}$ | $(Bu_4P)_3PO_4$ | $1.2 \times 10^{-4}$ | 9,800 | 490 | 0.016 | 0.049 |
| Comparative Example 1 | $Cs_2CO_3$ | $6.2 \times 10^{-7}$ | — | — | 6,500 | 482 | 0.014 | 0.029 |
| Comparative Example 2 | $Cs_2CO_3$ | $1.2 \times 10^{-6}$ | $Bu_4PBr$ | $8.2 \times 10^{-5}$ | 6,600 | 476 | Coloration | — |
| Comparative Example 3 | $Cs_2CO_3$ | $1.2 \times 10^{-6}$ | $Bu_3P$ | $8.2 \times 10^{-5}$ | 4,400 | 480 | 0.035 | 0.086 |
| Example 7 | $Cs_2CO_3$ | $6.2 \times 10^{-7}$ | $Bu_4PB(OH)_4$ | $1.25 \times 10^{-4}$ | 14,400 | 490 | 0.033 | 0.078 |
| Example 8 | $Cs_2CO_3$ | $6.2 \times 10^{-7}$ | $Bu_4PB(OH)_4$ | $2.5 \times 10^{-4}$ | 11,000 | 496 | 0.022 | 0.046 |

TABLE 2

| | Interesterification catalyst | | | | Analytical results for aromatic polycarbonate | | | |
|---|---|---|---|---|---|---|---|---|
| | Alkali metal compound | Amount (mol/ mol-BPA) | Quaternary phosphonium compound | Amount (mol/ mol-BPA) | Weight-average molecular weight (Mw) | Heat resistance (Td 5%, °C.) | Hue (UV, $A_{345}$) | Content of different kind of units (UV, $A_{318}$) |
| Example 9 | $Cs_2CO_3$ | $6.2 \times 10^{-7}$ | $Et_4PB(OH)_4$ | $1.25 \times 10^{-4}$ | 11,000 | 493 | 0.034 | 0.099 |
| Example 10 | $Cs_2CO_3$ | $6.2 \times 10^{-7}$ | $Et_4PB(OH)_4$ | $2.5 \times 10^{-4}$ | 12,000 | 498 | 0.027 | 0.090 |
| Example 11 | $Cs_2CO_3$ | $6.2 \times 10^{-7}$ | $(Et_4P)_2CO_3$ | $2.5 \times 10^{-4}$ | 11,200 | 490 | 0.029 | 0.084 |
| Example 12 | $Cs_2CO_3$ | $6.2 \times 10^{-7}$ | $(Et_4P)_2CO_3$ | $5.0 \times 10^{-4}$ | 10,400 | 490 | 0.050 | 0.085 |
| Example 13 | $Cs_2CO_3$ | $6.2 \times 10^{-7}$ | $(Et_4P)_3PO_4$ | $1.25 \times 10^{-4}$ | 9,800 | 490 | 0.046 | 0.091 |
| Comparative Example 4 | $Cs_2CO_3$ | $6.2 \times 10^{-7}$ | $Et_4POH$ | $2.5 \times 10^{-4}$ | 8,900 | 491 | 0.029 | 0.082 |

EXAMPLES 14 TO 16

Aromatic polycarbonates were obtained in the same manner as in Example 1, except that the alkali metal compounds shown in Table 3 and $(Bu_4P)_2CO_3$ were used as an interesterification catalyst in the amounts shown in the table.

The analytical results for the aromatic polycarbonates obtained are shown in Table 3.

COMPARATIVE EXAMPLES 5 AND 6

Aromatic polycarbonates were obtained in the same manner as in Example 1, except that the alkali metal compounds shown in Table 3 and tetraphenylphosphonium tetraphenylborate were used as interesterification catalyst components in the amounts shown in the table.

The analytical results for the aromatic polycarbonates obtained are shown in Table 3.

EXAMPLE 17

Into a 1.5-liter reactor made of SUS-316 and equipped with a stirrer and a distillation column were introduced 1.50 mol (343 g) of BPA (bisphenol A) and 1.61 mol (345 g) of DPC (diphenyl carbonate). After the atmosphere within the reactor was replaced with nitrogen gas, the contents were heated to 180° C. in a nitrogen atmosphere. To the resulting melt were added, with stirring, $1.13 \times 10^{-6}$ mol (0.37 mg) of $Cs_2CO_3$ (cesium carbonate) (925 μl of 0.04% aqueous solution thereof) and $2.25 \times 10^{-5}$ mol (5.09 mg) of $Et_4PB(OH)_4$ (tetraethylphosphonium tetrahydroxyborate; synthesized from an aqueous solution of tetraethylphosphonium hydroxide and an aqueous solution of boric acid through acid-base reaction) (94.2 μl of 5.4% aqueous solution thereof) as interesterification catalyst components.

The proportions of the interesterification catalyst components used to the BPA were $7.5 \times 10^{-7}$ and $1.5 \times 10^{-5}$, respectively, by mole.

Stirring was then continued for 30 minutes under those conditions. Subsequently, the reaction system was heated to 210° C. over 30 minutes and the pressure inside the reactor was reduced to 150 Torr. The reaction was continued for 30 minutes under those conditions while removing the distillate. The temperature of the reaction system was then further elevated to 270° C. over 30 minutes, and the pressure inside the reactor was gradually lowered to 0.2 Torr. The reaction was then continued for 1 hour and 30 minutes under those conditions.

TABLE 3

| | Interesterification catalyst | | | | Analytical results for aromatic polycarbonate | | | |
|---|---|---|---|---|---|---|---|---|
| | Alkali metal compound | Amount (mol/ mol-BPA) | Quaternary phosphonium compound | Amount (mol/ mol-BPA) | Weight-average molecular weight (Mw) | Heat resistance (Td 5%, °C.) | Hue (UV, $A_{345}$) | Content of different kind of units (UV, $A_{318}$) |
| Example 14 | $Li_2CO_3$ | $1.2 \times 10^{-6}$ | $Bu_4P)_2CO_3$ | $5.0 \times 10^{-5}$ | 10,700 | 489 | 0.030 | 0.148 |
| Example 15 | $Na_2CO_3$ | $1.2 \times 10^{-6}$ | $(Bu_4P)_2CO_3$ | $5.0 \times 10^{-5}$ | 9,700 | 492 | 0.028 | 0.147 |
| Example 16 | $K_2CO_3$ | $1.2 \times 10^{-6}$ | $(Bu_4P)_2CO_3$ | $5.0 \times 10^{-5}$ | 11,000 | 493 | 0.017 | 0.129 |
| Comparative Example 5 | $Cs_2CO_3$ | $1.2 \times 10^{-6}$ | $Ph_4PBPh_4$ | $5.0 \times 10^{-5}$ | 10,300 | 489 | 0.091 | 0.209 |
| Comparative Example 6 | $Na_2CO_3$ | $1.2 \times 10^{-6}$ | $Ph_4PBPh_4$ | $5.0 \times 10^{-5}$ | 10,100 | 486 | 0.105 | 0.264 |

Thus, 378 g of an aromatic polycarbonate prepolymer having a weight-average molecular weight ($M_w$) of 15,600 was obtained.

A 120 g portion of the aromatic polycarbonate prepolymer thus obtained was put in a twin-screw mixer having a capacity of 200 ml (manufactured by Tosoku Seimitsusha K.K., Japan), and allowed to react at 290° C. and 0.5 Torr for 30 minutes while removing by-products.

The aromatic polycarbonate finally obtained was analyzed, and found to have a weight-average molecular weight ($M_w$) of 28,800, a heat resistance (Td5%, °C.) of 506, a hue (UV, $A_{345}$) of 0.094, and a content of different kind of units (UV, $A_{318}$) of 0.114.

EXAMPLE 18

Into a 300-ml reactor made of SUS-316 and equipped with a stirrer and a distillation column were introduced 0.1 mol (22.8 g) of BPA (bisphenol A) and 0.105 mol (22.5 g) of DPC (diphenyl carbonate). After the atmosphere within the reactor was replaced with nitrogen gas, $2.5 \times 10^{-6}$ mol (0.57 mg) of $Et_4PB(OH)_4$ (tetraethylphosphonium tetrahydroxyborate; $^{11}$B-NMR (NMR-chemical shift of boron atom of this compound from boric acid) is $\delta=-15.8$ ppm) (10 μl of 0.26 mol/l aqueous solution thereof) was added thereto as a catalyst in a nitrogen atmosphere.

The reactor was heated to 150° C. to keep the mixture in a molten state at ordinary pressure for 1 hour. After the temperature was increased to 200° C., the pressure was gradually reduced to 20 Torr and this state was maintained for 1 hour to distill off the phenol.

The temperature of the reaction system was then further elevated to 270° C., and the pressure inside the reactor was lowered to 0.5 Torr at that temperature. Polycondensation was conducted under these conditions for 1 hour to obtain about 25 g of a polymer (aromatic polycarbonate).

The analytical results for the aromatic polycarbonate obtained are shown in Table 4.

EXAMPLES 19 TO 21

Aromatic polycarbonates were obtained in the same manner as in Example 18, except that the amount of $Et_4PB(OH)_4$ used as an interesterification catalyst was changed as shown in Table 4.

The analytical results for the aromatic polycarbonates obtained are shown in Table 4.

EXAMPLES 22 TO 25

Aromatic polycarbonates were obtained in the same manner as in Example 18, except that $Bu_4PB(OH)_4$ (tetrabutylphosphonium tetrahydroxyborate; $^{11}$B-NMR: $\delta=-17.1$ ppm) was used in place of $Et_4PB(OH)_4$ as an interesterification catalyst in the amounts shown in Table 4.

The analytical results for the aromatic polycarbonates obtained are shown in Table 4.

COMPARATIVE EXAMPLE 7

An aromatic polycarbonate was obtained in the same manner as in Example 18, except that $H_3BO_3$ ($^{11}$B-NMR: $\delta=0.0$ ppm) was used as an interesterification catalyst in an amount of $5.0 \times 10^{-6}$ mol (0.31 mg) (10 μl of 0.50 mol/l aqueous solution thereof).

The analytical results for the aromatic polycarbonate obtained are shown in Table 4.

COMPARATIVE EXAMPLE 8

An aromatic polycarbonate was obtained in the same manner as in Example 18, except that $(NH_4)_2 0.5B_2O_3$ ($^{11}$B-NMR: $\delta=-2.68$ ppm) was used as an interesterification catalyst in an amount of $2.5 \times 10^{-6}$ mol (1.003 mg) (10 μl of 0.25 mol/l aqueous solution thereof).

The analytical results for the aromatic polycarbonate obtained are shown in Table 4.

COMPARATIVE EXAMPLE 9

An aromatic polycarbonate was obtained in the same manner as in Example 18, except that $Et_4POH$ was used as an interesterification catalyst in an amount of $2.5 \times 10^{-5}$ mol (4.10 mg) (49.0 μl of 0.51 mol/l aqueous solution thereof).

The analytical results for the aromatic polycarbonate obtained are shown in Table 4.

TABLE 4

| | Interesterification catalyst | | Analytical results for aromatic polycarbonate | | | | |
|---|---|---|---|---|---|---|---|
| | | | Weight-average molecular weight (Mw) | Heat resistance (Td 5%, °C.) | *Hue (YI) | | Content of different kind of units (UV, $A_{318}$) |
| | Kind | Amount (mol/mol-BPA) | | | Initial | After thermal melting | |
| Example 18 | $Et_4PB(OH)_4$ | $2.5 \times 10^{-6}$ | 11,800 | 497 | 1.09 | 4.01 | 0.070 |
| Example 19 | $Et_4PB(OH)_4$ | $5.0 \times 10^{-6}$ | 11,600 | 493 | 1.14 | 4.05 | 0.060 |
| Example 20 | $Et_4PB(OH)4$ | $1.25 \times 10^{-4}$ | 11,200 | 495 | 1.10 | 4.02 | 0.084 |
| Example 21 | $Et_4PB(OH)_4$ | $2.5 \times 10^{-4}$ | 11,900 | 496 | 1.08 | 4.01 | 0.085 |
| Example 22 | $Bu_4PB(OH)_4$ | $5.0 \times 10^{-5}$ | 11,600 | 495 | 1.05 | 3.98 | 0.079 |
| Example 23 | $Bu_4PB(OH)_4$ | $6.3 \times 10^{-5}$ | 10,200 | 494 | 1.12 | 4.01 | 0.081 |
| Example 24 | $Bu_4PB(OH)_4$ | $1.25 \times 10^{-4}$ | 12,100 | 495 | 1.11 | 3.99 | 0.064 |
| Example 25 | $Bu_4PB(OH)_4$ | $2.5 \times 10^{-4}$ | 11,900 | 493 | 1.01 | 4.01 | 0.082 |
| Comparative Example 7 | $H_3BO_3$ | $5.0 \times 10^{-5}$ | 140 | — | — | — | — |
| Comparative Example 8 | $(NH_4)_2 0.5B_2O_2$ | $2.5 \times 10^{-5}$ | 3,260 | 456 | 1.54 | 5.21 | 0.092 |
| Comparative Example 9 | $Et_4POH$ | $2.5 \times 10^{-4}$ | 8,030 | 478 | 1.52 | 5.71 | 0.089 |

*The values of hue given in Table 4 were determined by the following method.

Hue

A 10% methylene chloride solution of each aromatic polycarbonate sample was prepared, and the YI of this solution was measured by the transmission method with a color tester (SC-1-CH) manufactured by Suga Shikenki K.K., Japan at a light pass length of 55 mm (initial hue and hue after thermal melting).

Thermal melting was conducted by heating the sample at 340° C. for 60 minutes in a nitrogen atmosphere in a glass test tube. Samples of the aromatic polycarbonates produced by the ordinary phosgene process have a YI after thermal melting of from 4 to 5.

As described and demonstrated above, a high-molecular aromatic polycarbonate having high heat resistance and a satisfactory hue can be obtained by the non-phosgene process of the present invention.

While the invention has been described in detail and with reference to specific embodiments thereof, it will be apparent to one skilled in the art that various changes and modifications can be made therein without departing from the spirit and scope thereof.

What is claimed is:

1. A process for producing an aromatic polycarbonate which comprises melt-polycondensing an aromatic diol compound with a diaryl carbonate compound represented by formula (I):

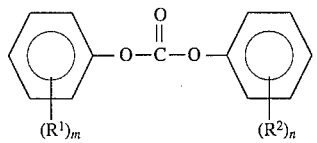

wherein $R^1$ and $R^2$ each independently represent an alkyl group having 1 to 10 carbon atoms or an alkoxy group, and m and n each is 0 or an integer of 1 or 2, in the presence of an interesterification catalyst, said interesterification catalyst comprising a quaternary phosphonium salt compound represented by formula (II):

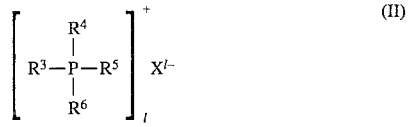

wherein $R^3$, $R^4$, $R^5$, and $R^6$ each independently represent an alkyl group having 1 to 12 carbon atoms, an aryl group, an aralkyl group, or a cycloalkyl group, and $X^{l-}$ is an anion selected from the group consisting of a carbonate ion, a phosphate ion, and a tetrahydroxyboron ion, with the letter l indicating the valency of X.

2. The process as claimed in claim 1, wherein the interesterification catalyst comprises a combination of (a) the quaternary phosphonium salt compound represented by formula (II) and (b) an alkali metal compound.

3. The process as claimed in claim 1, wherein the anion as a constituent of the quaternary phosphonium salt compound is a carbonate ion or a tetrahydroxyboron ion.

4. The process as claimed in claim 1, wherein the quaternary phosphonium salt compound is selected from the group consisting of tetraethylphosphonium carbonate, tetraethylphosphonium tetrahydroxyborate, tetrabutylphosphonium carbonate, and tetrabutylphosphonium tetrahydroxyborate.

5. The process as claimed in claim 2, wherein the alkali compound is an inorganic alkali metal compound selected from the group consisting of the hydroxides, carbonates, and hydrogencarbonates of lithium, sodium, potassium, rubidium, and cesium.

6. The process as claimed in claim 2, wherein the alkali metal compound is a cesium compound.

7. The process as claimed in claim 6, wherein the cesium compound is selected from the group consisting of cesium carbonate, cesium hydrogencarbonate, and cesium hydroxide.

8. The process as claimed in claim 1, wherein the quaternary phosphonium salt compound is used in an amount of from $10^{-6}$ to $10^{-3}$ mol per mol of the aromatic diol compound.

9. The process as claimed in claim 2, wherein the alkali metal compound is used in an amount of from $10^{-8}$ to $10^{-6}$ mol per mol of the aromatic diol compound.

10. The process as claimed in claim 2, wherein the alkali metal compound and the quaternary phosphonium salt compound are used in a proportion of from $10^{-6}:1$ to $1:1$ by mole.

11. The process as claimed in claim 1, wherein the aromatic diol compound is 2,2-bis(4-hydroxyphenyl)propane.

12. The process as claimed in claim 1, wherein the diaryl carbonate compound represented by formula (I) is diphenyl carbonate.

* * * * *